United States Patent [19]

Otani

[11] Patent Number: 4,716,557
[45] Date of Patent: Dec. 29, 1987

[54] APPARATUS FOR INFORMATION RETRIEVAL FROM AN OPTICALLY READABLE STORAGE DISC

[75] Inventor: Kiyoshi Otani, Saitama, Japan
[73] Assignee: Sanyo Electric Co., Ltd., Japan
[21] Appl. No.: 836,238
[22] Filed: Mar. 4, 1986

[30] Foreign Application Priority Data

Mar. 8, 1985 [JP] Japan ................................ 60-46804
Mar. 14, 1985 [JP] Japan ................................ 60-50866

[51] Int. Cl.$^4$ .......................... G11B 7/00; G11B 27/00
[52] U.S. Cl. ........................................ 369/32; 369/33; 369/41; 369/44
[58] Field of Search ...................... 360/78; 369/32, 33, 369/41, 43, 44; 365/234; 358/907

[56] References Cited

U.S. PATENT DOCUMENTS

| | | | |
|---|---|---|---|
| 4,428,074 | 1/1984 | Abe et al. | 369/32 |
| 4,498,158 | 2/1985 | Akiyama | 369/32 |
| 4,506,355 | 3/1985 | Dakin et al. | 369/32 |
| 4,592,035 | 5/1986 | Miyasho | 369/32 |
| 4,608,676 | 8/1986 | Yoshida et al. | 369/32 |

FOREIGN PATENT DOCUMENTS

0114508 8/1984 European Pat. Off. .............. 369/32

*Primary Examiner*—Aristotelis M. Psitos
*Assistant Examiner*—Steven R. Garland
*Attorney, Agent, or Firm*—Darby & Darby

[57] ABSTRACT

An information selection device of a disc player comprises a pickup device (1), a signal processing circuit (12) and a moving device (16). The signal processing circuit (12) comprises a read circuit (13), a write circuit (14) and a comparator (15). At the time of searching a desired piece number and a desired index, these desired piece number and index are written in the write circuit (14). The pickup device (1) radiates a light beam on a disc (8) so that the piece number and the index of the track traced at present are detected by the read circuit (13) at predetermined time intervals from the beam modulated and reflected on the disc (8). Then, the detected piece number and index are compared by the comparator (15) with the desired piece number and index written in the write circuit (14). As a result of the comparison, each time it is determined that the hitting point of the radiated beam has passed the track at the start of the desired piece number and index, the signal processing circuit (12) generates a different control signal and applies it to the moving device (16) so that the moving direction of the radiated beam is reversed and the moving speed of the beam is gradually decreased. After the above described operation is repeated by a predetermined number of times, the movement of the radiated beam is stopped and then the search is completed.

8 Claims, 5 Drawing Figures

APPARATUS FOR INFORMATION RETRIEVAL FROM AN OPTICALLY READABLE STORAGE DISC

BACKGROUND OF THE INVENTION

1. Field of the Invention

The present invention relates to an information selection device of a disc player and particularly to an information selection device which can rapidly search a desired piece number and a desired index on a disc where a plurality of pieces are optically recorded so that the disc player can start to play the music of the desired piece number and index.

2. Description of the Prior Art

A disc player which uses an optical pickup to reproduce a digital signal from a disc where concavities and convexities corresponding to the digital signal are engraved, for example, a digital audio disc player is well-known in the art. In the case of a digital audio disc player currently put on the market, an index of a disc called a table of contents (TOC) is recorded on a lead-in track located on the innermost circumference of the disc and this TOC includes data on the pieces recorded on the disc indicating a time code value of each piece, that is, the time represented as minutes and seconds when each piece is to be played from the first track of the program area of the disc. Subcodes in each frame of the signal contain data on the piece number and the index which the signal frame belongs to, the time represented as minutes and seconds required from the first track of the program area, etc. If the disc thus structured is set in a play mode, the disc player first reads and stores the above described TOC.

Such a conventional digital audio disc player uses a method for rapidly searching a track to be started, that is, a target track of a desired piece out of a plurality of pieces recorded on a disc. Such a method is disclosed for example in the Japanese Patent Laying-Open Gazette No. 8695/1980 (U.S. Pat. No. 4,506,355). According to the method disclosed in this gazette, the first means first selects a target address of a target track of a desired piece to be played. Then, in a search mode period, that is, in a period when the moving means moves the incident beam relatively toward the disc so that the incident beam crosses the tracks, the second means monitors the modulated beam so that the address of the track hit by the incident beam is detected from the information recovered by the hitting of the incident beam onto the disc. In this search mode period, the third means detects an indication of the distance between the target track and the hitting point of the incident beam and the moving means is adjusted by the control means so that the distance between the hitting point of the incident beam and the target track may be decreased. As the above described distances is decreased, the moving speed of the beam is reduced. When the target track is detected, the control means stops the moving means to bring the search to an end.

More specifically described, the indication of the distance between the target track and the hitting point of the incident beam can be obtained by detection of a difference between the time period converted based on the distance from the lead-in track to the track hit by the incident beam and the time period converted based on the distance from the lead-in track to the target track. In other words, when the piece number of a desired piece to be played is designated, the time period required from the first track of the program area of the disc to the track at the start of the designated piece is determined from the content of the TOC stored in the disc player as described above and this time period is regarded as the target time. In addition, the time period required from the first track of the program area to the track hit by the radiated beam at present is determined by the subcode in each frame of the signal. Accordingly, the distance between the target track and the hitting point of the incident beam can be determined as the time by detection of a difference between the above described target time and the time required to attain the track hit by the beam. According to the magnitude of the indication of the distance, the moving speed of the moving means is determined by steps and as a result, the hitting point of the incident beam never exceeds the target track and the target track can be searched rapidly.

As described above, the TOC stores the time from the first track of the program area to the track at the start of each piece, that is, the "absolute time (A time)". However, the TOC does not store the A time from the first track of the program area to each index existing within each piece and consequently, the indexes existing within each piece cannot be searched directly.

SUMMARY OF THE INVENTION

In brief, the present invention is an information selection device of a disc player which optically reads information from a disc having a plurality of tracks where information of a plurality of pieces is optically recorded, and said information selection device comprises: pickup means for radiating a light beam on the tracks of the disc; beam detecting means for detecting information from the beam reflected from the track; moving means for moving the radiated beam to make the beam cross the tracks of the disc; and signal processing means.

The information of each of the plurality of pieces contains information of its own piece number and information concerning a plurality of indexes existing within the piece. The light beam radiated and hit on the disc is modulated and reflected so that the beam detecting means detects at predetermined intervals the information of the piece number and the index of the track hit by the beam at present from the reflected beam.

The signal processing means comprises read means, write means and comparing means. The read means reads the information detected by the beam detecting means concerning the piece number and the index of the track hit by the radiated beam at present. The write means writes therein the information of the piece number and the index of a desired piece to be played selected out of the plurality of pieces. The comparing means compares the piece number and index information of the track hit by the radiated beam at present, read by the read means and the desired piece number and index information of the selected desired piece written in advance in the writing means. Each time it is determined that the radiated beam passes the track at the start of the desired piece number and index information, a control signal of a kind different is generated and applied to the moving means so that the moving direction of the radiated beam is changed reversely and the moving speed of the beam is successively decreased by steps. After a predetermined number of control signals are generated, generation of a control signal is stopped.

According to another aspect of the present invention, each of the plurality of tracks has its own address information and the signal processing means further comprises read means, write means, first comparing means, a first register, a second register and second comparing means. The read means reads the address information of the track hit by the radiated beam at present, which is detected by the beam detecting means. The write means writes the address information of the target track including the desired piece and index information of a desired piece to be played, selected out of a plurality of pieces. The first comparing means compares the address information of the track hit by the radiated beam at present, read by the reading means and the address information of the target track written in advance in the write means and generates and applies to the moving means a control signal for changing reversely the moving direction of the radiated beam each time it is determined that the radiated beam passes the target track. As a result of the comparison by the first comparing means, the address information of the track hit by the radiated beam is written in the first register when the address information of the track hit by the radiated beam is smaller than the address information of the target track. The address information of the track hit by the radiated beam is written in the second register when it is determined as a result of the comparison by the first comparing means that the address information of the track hit by the radiated beam is larger than the address information of the target track. The second comparing means compares the address information written in the first register and the address information written in the second register. When it is determined that the absolute value of a difference between the address information written in the first register and the address information written in the second register is smaller than a first set value and that the radiated beam has passed the target track, the second comparing means generates a control signal for decreasing the moving speed of the radiated beam from the first velocity to the second velocity. When it is determined that the absoluted value of a difference therebetween is smaller than a second set value and that the radiated beam has passed the target track, it generates a control signal for decreasing the moving speed of the radiated beam from the second velocity to the third velocity. Thus, until the difference therebetween becomes smaller than the n-th set value, the second comparing means generates control signals for successively decreasing the moving speed of the radiated beam and after the difference becomes smaller than the n-th set value, it generates a control signal for moving the radiated beam toward the track corresponding to the address information written in the first register or the second register.

Therefore, a principal object of the present invention is to provide an information selection device of a disc player, capable of not only sensing the beginning of a desired piece of music but also directly searching an index existing within each piece.

A principal advantage of the present invention is that each time it is determined that the radiated beam has passed the track at the start of desired piece number and index information, the moving direction of the radiated beam is changed reversely and the moving speed thereof is decreased gradually by steps, which makes it possible to rapidly search a desired index of a desired piece number.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
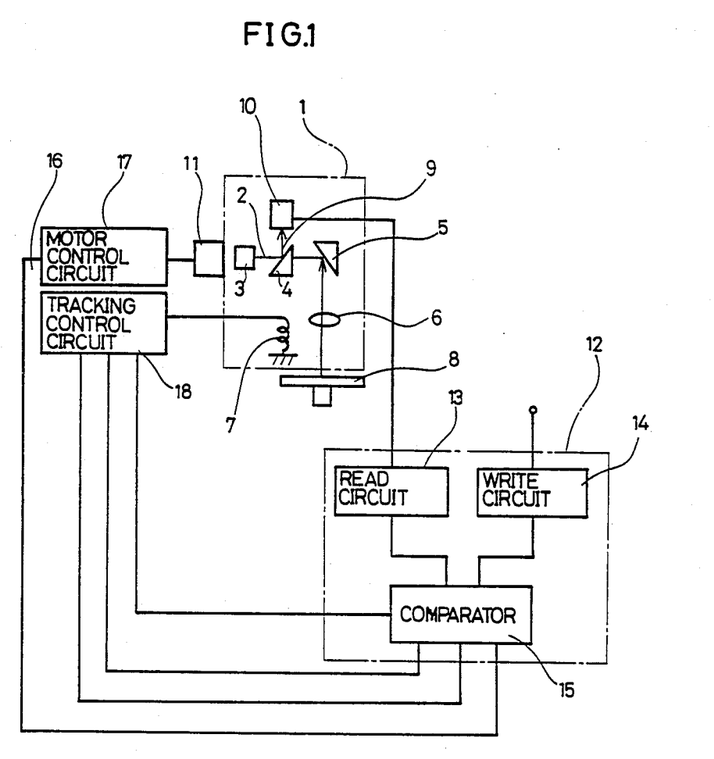
FIG. 1 is a schematic block diagram showing a structure of the first embodiment of the present invention.

FIG. 1 is a schematic block diagram showing an information selection device of a disc player in accordance with an embodiment of the present invention. First referring to FIG. 1, a structure of an embodiment of the present invention will be described. The embodiment shown in FIG. 1 mainly comprises a pickup device 1, a signal processing device 12 and a moving device 16. The pickup device 1 comprises a laser beam supplier 3 for generating laser beam 2. The beam 2 generated by the laser beam supplier 3 is radiated on the surface of a disc 8 by means of a beam splitter 4, a mirror 5 and an objective lens 6. The beam modulated and reflected on the surface of the disc 8 is guided by means of the objective lens 6 and the mirror 5 so as to be obtained as a modulated beam 9 by means of the beam splitter 4. This modulated beam 9 is detected by a photodetector 10. The whole structure of the pickup device 1 is placed on a pickup base (not shown) and a motor 11 moves the pickup device 1 radially on the disc 8. As a result, the radiated beam 2 is moved to cross the tracks on the disc 8. The objective lens 6 is moved horizontally on the disc 8 by the control of the electric current flowing in tracking coils 7 so that the radiated beam 2 is moved finely from one track to another track on the disc 8. The signal processing circuit 12 at least comprises a read circuit 13 for reading and storing information from the modulated beam detected by the photodetector 10, a write circuit 14 for writing information inputted by key operation and the like, and a comparator 15 for comparing the information stored in the read circuit 13 and the information stored in the write circuit 14 to generate various control signals according to the result of the comparison. The moving device 16 comprises a motor control circuit 17 and a tracking control circuit 18, which are controlled by various control signals from the comparator 15 of the signal processing circuit 12. The motor control circuit 17 controls the motor 11 to move the pickup base and the tracking control circuit 18 controls the electric current applied to the tracking coils 7 so that the radiated beam 2 is moved by tracking jump.

Figure 2:
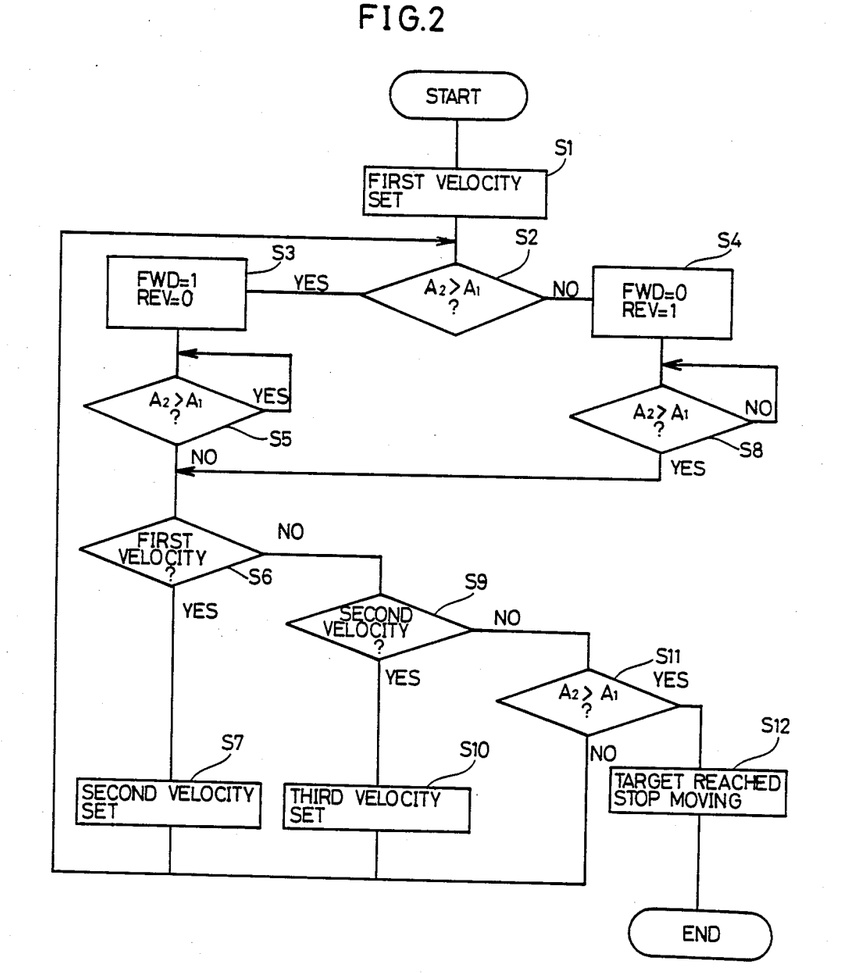
FIG. 2 is a flow chart for explaining an operation of the embodiment shown in FIG. 1.

FIG. 2 is a flow chart for explaining an operation of the embodiment shown in FIG. 1. Now referring to FIG. 2, a searching operation will be specifically described. First, when the piece number of a desired piece to be played and a desired index within the piece (referred to hereinafter as the piece number and index data) are inputted by operation of keys and the like, the desired piece number and index data is written in the write circuit 14 of the signal processing circuit 12. Then, the first control signal generated first by the comparing means 15 of the signal processing circuit 12 is applied to the motor control circuit 17. As a result, the motor 11 is rotated and the pickup base is moved so that the pickup device 1 is moved over the disc 8. The disc 8 is also rotated by a disc motor (not shown). The beam 2 radiated by the laser beam supplier 3 is reflected on the mirror 5 and converged through the objective lens 6 to hit a track of the disc 8 so that it is modulated and reflected by the information on the indexes etc. stored therein. The reflected and modulated beam 9 is split by the beam splitter 4 and applied to the photodetector 10. The photodetector 10 picks up an information signal of an index etc. of the above stated track and applies it to the read circuit 13 of the signal processing circuit 12 so that it is read by the read circuit 13. Thus, the read circuit 13 reads the piece number and index data A1 of the track hit by the radiated beam 2 at present and the data A1 is compared by the comparator 15 with the desired piece number and index data A2 written in the write circuit 14 (in the step 2). If the piece number and index data A1 of the track hit at present is smaller than the desired piece number and index data A2, comparator 15 generates a control signal enabling the radiated beam 2 to move in the first direction toward outside because the radiated beam 2 hits the track located more inwardly than the track on which the music of the desired piece number and index data is to start (in the step 3). If the piece number and index data A1 of the track hit by the beam at present is larger than or equal to the desired piece number and index data A2, the comparator 15 generates a control signal enabling the radiated beam 2 to move in the second direction toward inside because the radiated beam 2 hits the track located more outwardly than the track on which the music of the desired piece number and index data is to start (in the step 4). After the moving direction of the radiated beam 2 is determined by the comparator 15 as described above, the motor control circuit 17 rotates the motor 11 to move the pickup base so that the radiated beam 2 is moved at the first velocity. Now assuming that the radiated beam 2 is applied to a track located more inwardly than the target track, the radiated beam 2 is moved in the first direction at the first velocity and during this movement, the piece number and index data of a track is read at predetermined intervals, for example, every 34 ms so that the comparator 15 of the signal processing circuit 12 compares the data (in the step 5). When it is determined as a result of the comparison that the present piece number and index data A1 of the track hit by the radiated beam at present is smaller than the desired piece number and index data A2, the radiated beam 2 is moved continuously at the first velocity in the first direction since the radiated beam 2 does not pass the track at the start of the desired piece number and index data. When the comparator 15 determines that the thus read present piece number and index data A1 of the track hit by the beam becomes larger than or equal to the desired piece number and index data A2 after the movement of the radiated beam 2 at the first velocity in the first direction, it is verified that the hitting point of the radiated beam 2 has passed the track at the start of the desired piece number and index data (in the step 5). Then, it is necessary to move the radiated beam 2 at the second velocity slower than the first velocity in the second direction opposite to the first direction. More specifically, after the comparator 15 determines that the desired piece number and index data A2 becomes smaller than or equal to the present piece number and index data A1 (in the step 5), it determines whether the moving speed of the radiated beam 2 at that time is the first velocity or not (in the step 6). If it is determined that the moving speed is the first velocity, the moving speed is set to the second velocity (in the step 7). Since the desired piece number and index data A2 compared by the comparator 15 in this case is not larger than the present piece number and index data A1 (in the step 2), the moving direction of the radiated beam 2 is changed to the second direction (in the step 4). The second control signal for selecting the above described conditions, that is, the second velocity and the second direction is obtained from the comparator 15 and it is applied to the tracking coils 7 through the tracking control circuit 18. Assuming that the radiated beam 2 at the second velocity is moved by jumping every ten tracks for example, the second control signal is a pulse signal having a width enabling the radiated beam to jump every ten tracks. Thus, the radiated beam 2 in this case is moved by every ten tracks in the second direction from an outer circumference toward an inner circumference of the disc so that the radiated beam 2 approaches the track at the start of the desired piece number and index data. During this movement in the second direction, the read circuit 13 reads the present piece number and index data A1 of a track hit by the radiated beam 2 at predetermined intervals (of ten tracks) and the comparator 15 compares the data A1 and the desired piece number and index data A2. If it is determined as a result of the comparison by the comparator 15 that the desired piece number and index data A2 is not larger than the present piece number and index data A1, the radiated beam 2 exists on a circumference located more outwardly than the track at the start of the desired piece number and index data and does not pass this track yet. Accordingly, the radiated beam 2 is moved continuously in the second direction by every ten tracks toward the track at the start of the desired piece number and index data (in the step 8). If it is determined by the comparator 15 that the desired piece number and index data A2 becomes larger than the present piece number and index data A1 (in the step 8) and it is determined that the radiated beam 2 has passed again the track at the start of the desired piece number and index data, the signal processing circuit 12 controls the moving device 16 so that the moving direction of the radiated beam 2 is changed reversely and the moving speed thereof is decreased to the third velocity. This operation will be more specifically described in the following according to the flow chart in the same manner as described above. If it is determined by the comparator 15 that the desired piece number and index data A2 becomes larger than the present piece number and index data A1 (in the step 8), it is determined whether the moving speed of the radiated beam 2 is the first velocity or not in the same manner as described above (in the step 6). If it is not the first velocity, it is determined whether it is the second velocity or not (in the step 9). If the moving speed of the radiated beam 2 at that time is the second velocity, the moving speed is set to the third speed (in the step 10) and the moving direction is changed again to the first direction (in the step 2). More specifically, the comparator 15 generates a third control signal of a pulse width enabling the radiated beam 2 to move in the initial first direction by one track and applies the third control signal to the tracking coils 7 through the tracking control circuit 18 to move the objective lens 6 so that the radiated beam 2 is moved. If the present piece number and index data A1 has been read every ten tracks during the movement of the radiated beam 2 in the second direction at the second velocity, the radiated beam 2 in this case exists within ten tracks of the track at the start of the desired piece number and index data A2 except that the address of the track hit by the radiated beam immediately after it has passed the track at the start of the desired piece number and index data A2 cannot be read. Then, each time the above described radiated beam 2 moves by one track, the present piece number and index data A1 is read and the comparator 15 observes when the desired piece number and index data A2 becomes smaller than the present piece number and index data A1 (in the step 5). When the data A2 becomes smaller than the data A1, the comparator 15 determines whether the moving speed of the radiated beam 2 at that time is the first velocity (in the step 6) or the second velocity (in the step 9). If it is determined that the moving speed is neither the first velocity nor the second velocity but the third velocity, the comparator 15 compares again the present piece number and index data A1 and the desired piece number and index data A2 (in the step 11). When it is determined as a result of the comparison that the desired piece number and index data A2 is not larger than the present piece number and index data A1, the moving direction of the radiated beam 2 is changed to the above described second direction (in the step 4) so that the radiated beam 2 is moved in the second direction at the third velocity until it passes the track at the start of the desired piece number and index data. When it is determined that the radiated beam 2 has passed the track at the start of the desired piece number and index data A2 and that the desired piece number and index data A2 becomes larger than the present piece number and index data A1 (in the step 11), the comparator 15 stops generation of the third control signal to stop the searching (in the step 12). At this time, the radiated beam 2 exists within one or two tracks from the track at the start of the desired piece number and index data A2 except for the case in which the read circuit 13 cannot read the present piece number and index data A1 of the track hit by the radiate beam 2 immediately after it has passed the track at the start of the desired piece number and index data A2. Accordingly, if the comparator 15 applies a normal tracking servosignal to the tracking coils 7 through the tracking control circuit 18 so that the tracking servocontrol is performed, the radiated beam 2 can immediately attain the track at the start of the desired piece number and index data.

Figure 3:
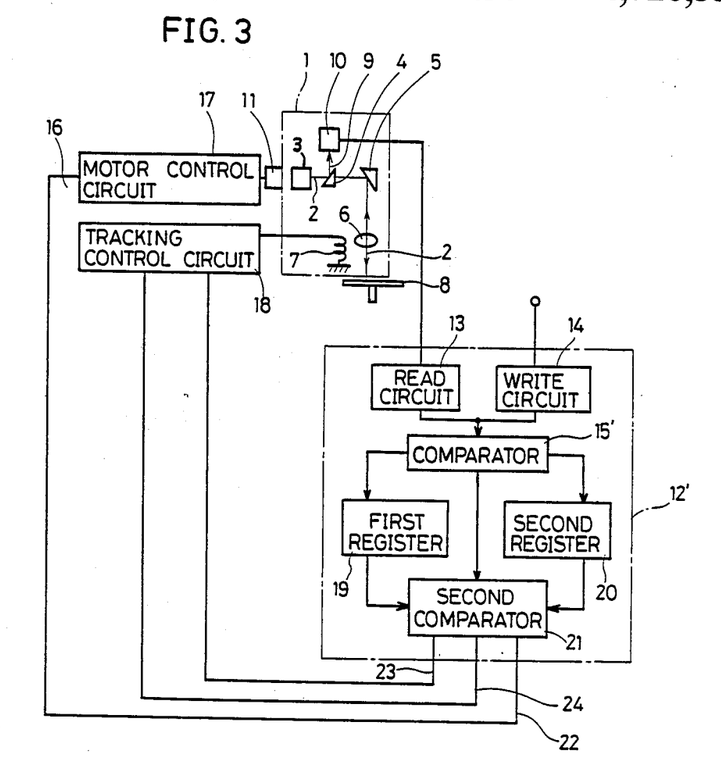
FIG. 3 is a schematic block diagram showing a structure of the second embodiment of the present invention.

FIG. 3 is a schematic block diagram showing an information selection device of the second embodiment of the present invention. The embodiment shown in FIG. 3 is the same as the embodiment shown in FIG. 1 except for the below described points. A signal processing circuit 12' of the embodiment shown in FIG. 3 comprises a first comparator 15' for generating a control signal for determining the searching direction by comparison between the address (indicating a piece number and an index) of the track read at present, which is detected by the photodetector 10 and stored in the read circuit 13 and the address (indicating a piece number and an index) of the desired track selected by key operation or the like, which is stored in the write circuit 14. The signal processing circuit 12' further comprises a first register 19 for writing the address read by the read circuit 13 when the first comparator 15' determines by the comparison that the address (the piece number and the index) read by the read circuit 13 is smaller than the address (the piece number and the index) written by the write circuit 14 and a second register 20 for writing the address read by the read circuit 13 when the first comparator 15' determines by the comparison that the address (the piece number and the index) written by the write circuit 14 is smaller than the address (the piece number and the index) read by the read circuit 13. The signal processing circuit 12' further comprises a second comparator 21 for comparing the address written in the first register 19 and the address written in the second register 20 to generate various control signals for determining the searching speed according to the absolute value of the difference between the addresses (the difference in the A time of the addresses).

Figure 4:
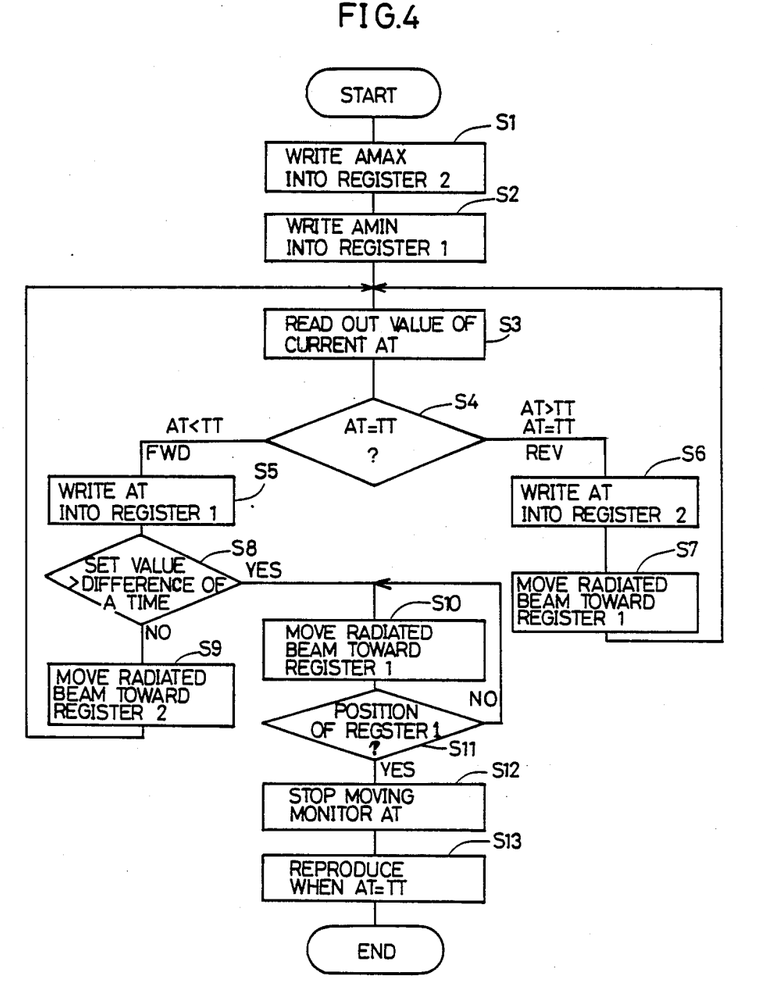
FIG. 4 is a flow chart for explaining an operation of the embodiment shown in FIG. 3.
Figure 5:
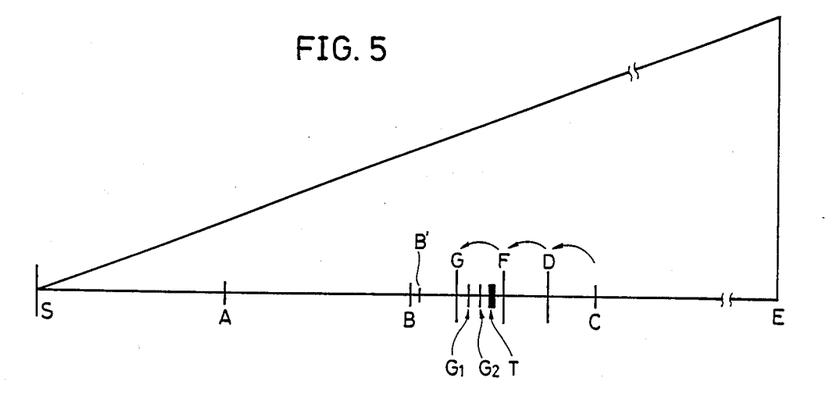
FIG. 5 is a diagram explaining the state in which addresses are read in the embodiment shown in FIG. 3.

FIG. 4 is a flow chart for explaining an operation of the embodiment shown in FIG. 3 and FIG. 5 is a diagram for explaining the state in which addresses are read in the embodiment shown in FIG. 3. Referring to FIGS. 3 to 5, a specific operation for searching addresses in accordance with this embodiment will be described. First, when a disc 8 is set in a player, the disc 8 starts to rotate and the pickup device 1 crosses the lead-in track located on the innermost circumference of the disc 8 so that the maximum address (AMAX, for example, a time code at the end of the last piece) corresponding to the track E (in FIG. 5) on the outermost circumference and the minimum address (AMIN, for example, a time code of the first piece) corresponding to the track S (in FIG. 5) on the innermost circumference are read from th lead-in track. The thus read maximum address (AMAX) is written in the second register 20 (in the step 1) and the thus read minimum address (AMIN) is written in the first register 19 (in the step 2).

Then, a piece selection button (not shown) is operated so that the address TT (indicating a piece number and an index) of the track of a selected piece is written in the write circuit 14. Subsequently, the pickup device 1 is moved at the high first velocity toward the target track by rotation of the motor 11. At this time, the beam 2 radiated by the laser beam supplier 3 is reflected on the mirror 5 and converged by the objective lens 6 to hit a track of the disc 8 so that it is modulated by the information stored therein and reflected. The reflected modulated beam 2 is split by the beam splitter 4 and applied to the photodetector 10. The photodetector 10 picks up an information signal indicating the address etc. of the track and applies it to the read circuit 13 of the signal processing circuit 12' so that it is read by the read circuit 13.

Thus, the read circuit 13 reads at predetermined time intervals (of 34 ms in this embodiment) the address AT (for example, a piece number and an index, or the time such as the A time accumulated from the first track of the program area to the track concerned) of a track A, B or C on the disc 8 as shown in FIG. 5 (in the step 3).

Each of the above described predetermined time intervals for reading needs to be a value smaller than a predetermined distance determined at the time of setting the searching speed. For example, if the difference between the A time of the target track and the A time of the present track hit by the radiated beam becomes smaller than 34 ms, it is necessary to make each interval for reading smaller than 34 ms at the time of changing the searching speed from the first velocity to the second velocity.

The address of the present track read as described above is first applied from the read circuit 13 to the first comparator 15', where only the piece number and index data in that address is picked up. On the other hand, the address of the target track written in the write circuit 14 is also applied to the comparator 15', where only the piece number and index data in the address is picked up. The piece number and index data thus picked up are compared by the first comparator 15' (in the step 4). If the radiated beam 2 hits the track A, the piece number and index data in the address of the track A thus read is smaller than the piece number and index data in the address of the target track and accordingly the pickup device 1 is continuously moved in the first direction so that the A time of the track thus read is written in the first register 19 (in the step 5). Thus, as the pickup device 1 moves, the A time data in the address of a track read at the above described predetermined intervals is successively written in the first register 19 until the hitting point of the radiated beam 2 passes the target track T (in FIG. 5).

When it is determined by the first comparator 15' that the address AT (the piece number and index data) of the track hit by the radiated beam 2 is larger than the address TT (the piece number and index data) of the target track and that the hitting point of the radiated beam 2 has passed the target track, the A time in the address of the track C (in FIG. 5) hit by the radiated beam 2 is written in the second register 20 (in the step 6). When it is determined by the comparison by the comparator 15' as described above that the hitting point of the radiated beam 2 has passed the target track T, the first comparator 15' generates a control signal for changing reversely the moving direction of the pickup device 1 and applies it to the moving device 16. The A time in the address of the track B read immediately before the hitting point of the radiated beam 2 passes the target track T is written in the first register 19 and the second comparator 21 calculates the difference between the A time in the address of the track B written in the first register 19 and the A time in the address of the track C written in the second register 20 immediately after the radiated beam 2 has passed the target track. Since each interval for reading corresponds to a value smaller than the distance determined at the time of setting the second velocity as described above, the absolute value of the above described difference in the A time is smaller than the value of the distance determined at the time of setting the second velocity. In consequence, the second comparator 21 generates, instead of the first control signal applied from a terminal 22 thereof to the motor control circuit 17, a second control signal for moving the radiated beam 2 in the opposite direction at a speed slower than that by the first control signal and applies it from a terminal 23 to the tracking control circuit 18. The above described second control signal is supplied to the tracking coils 7 through the tracking control circuit 18. In this state, the control signal is not applied to the motor control circuits 17 but is applied only to the tracking control circuit 18. Accordingly, the pickup base of the pickup device 1 is not moved and only the objective lens 6 is moved so that the radiated beam 2 crosses in the direction opposite to that in the case of the first control signal at the second velocity (17 ms) slower than the first velocity. More specifically, the radiated beam 2 is moved from the track C to the target track T by jumping every ten tracks. In this case also, the radiated beam 2 is moved (in the step 7) so that the read circuit 13 reads the address of one of the tracks D, F and G (as shown in FIG. 5) located at predetermined intervals each time the radiated beam 2 hits one of them and that the address set in the second register 20 approaches the address set in the first register 19. At the same time, the first comparator 15' compares the piece number and index data in the address of the present track thus read and the piece number and index data in the address of the target track T and determines whether the radiated beam 2 has passed the target track T. The A time data in the address of each track thus read is written successively in the second register 20 until the radiated beam 2 passes the target track T. When the radiated beam 2 has passed the target track T, the A time in the address of the track read immediately after the passing is written in the first register 19. Also when the radiated beam 2 has passed the target track T, the second comparator 21 generates from a terminal 24 a third control singal for reversing again the moving direction of the radiated beam 2. In this case, the second register 20 writes the A time in the address of the track F (in FIG. 5) read immediately before the radiated beam 2 passes the target track T and the first register 19 writes the A time in the address of the track G (in FIG. 5) read immediately after the radiated beam 2 has passed the target track T. As a result, the absolute value of the difference detected by the second comparator 21 by comparison between the A time in the address of the first register 19 and the A time in the address of the second register 20 becomes smaller than the value of the distance determined at the time of setting the third velocity and the above described third control signal becomes a signal of an amount for enabling the radiated beam 2 to move at the third velocity slower than the second velocity. Accordingly, when the third control signal is applied to the tracking coil 7 through the tracking control circuit 18, the objective lens 6 moves the radiated beam 2 toward the target track T in the same direction as the initially selected first direction by every three tracks of the disc 8. Thus, the radiated beam 2 is moved (in the step 9) so that the A time in the address of each of the tracks G1 and G2 (in FIG. 5) located at predetermined intervals is successively read and written in the first register 19 and the A time in the address of the first register 19 approaches the A time in the address of the second register 20. When the difference detected by the second comparator 21 by comparison between the A time in the address of the first register 19 and the A time in the address of the second register 20 becomes smaller than a prescribed value within the searching range (in the step 8), the radiated beam 2 is moved to the address written in the first register 19 (in the step 10) and after that, the movement of the radiated beam 2 is stopped (in the steps 11 and 12). Since the A time in the address written in the first register 19 at this time is the A time in the address of the track G2 (in FIG. 5) coming immediately before the target track T, the radiated beam 2 attains the target track T in a waiting state for play (in the step 13).

As described above, the addresses of the respective tracks A, B and C are read at predetermined time intervals corresponding to the respective tracks while the radiated beam 2 is moved for searching. However, it sometimes happens that addresses of some tracks can not be read due to dust or the like on the disc. For example, if the read circuit 13 can not read the address of the track C hit by the radiated beam 2 immediately after the hitting point of the radiated beam 2 has passed the target track T, the radiated beam 2 continues to be moved in the same direction. If the read circuit 13 reads on the subsequent occasion the address of the track hit by the radiated beam 2 at that time, the first comparator 15' compares the read address and the address of the target track and when it is determined that the hitting point of the radiated beam 2 has passed the target track T, the moving direction of the radiated beam 2 is changed reversely. In this case, the A time in the address of the track located more outwardly than the track C hit by the radiated beam 2 is set in the second register 20 and the A time in the address of the track B hit by the radiated beam 2 immediately before the hitting point thereof passes the target track T is set in the first register 19. Accordingly, since the absolute value of the difference between the A time in the address set in the first register 19 and the A time in the address set in the second register 20 is larger than the value of the distance determined at the time of setting the second velocity, the radiated beam 2 moves in the opposite direction with the first velocity unchanged. Then, the A time data in the addresses of the tracks hit by the radiated beam 2 are set in the second register 20 until the hitting point of the radiated beam 2 exceeds the target track T. As a result, if the radiated beam 2 deviates a little to hit the track D located a little more inwardly than the track C, the absolute value of the difference between the A time of the address set in the first register 19 and the A time of the address set in the second register 20 becomes smaller than the value of the distance determined at the time of setting the second velocity and subsequently the radiated beam 2 is moved at the velocity decreased to the second velocity.

If the read circuit 13 can not read the address of the track B coming immediately before the hitting point of the radiated beam 2 passes the target track T and reads the address of the track C hit by the radiated beam 2 immediately after the hitting point thereof has passed the target track T, the first comparator 15' determines that the hitting point of the radiated beam 2 has passed the target track T and the moving direction of the radiated beam 2 is reversed as described above. However, since the A time in the address of the track C is set in the second register 20 while the A time in the address of the track A is kept set in the first register 19, the absolute value of the difference between the A time in the address set in the first register 19 and that in the second register 20 is larger than the distance value determined at the time of setting the second velocity and consequently, the radiated beam 2 is moved in the opposite direction with the first velocity unchanged. Then, the address read on the subsequent occasion is the address of the track B' which slightly deviates from the track B to be attained by the radiated beam 2 after it has passed the target track T. Since the A time in the address of the track B' is set in the first register 19, the absolute value of the difference between the A time in the address set in the first register 19 and that in the second register 20 becomes smaller than the distance value determined at the time of setting the second velocity and the radiated beam 2 has passed again the target track T, the moving direction thereof is reversed again so that the radiated beam 2 is moved at the second velocity in the same direction as in the initially set direction. Thus, the same operation as described above is repeated to complete the searching.

In the above described embodiment, for the purpose of determining whether the hitting point of the radiated beam 2 exceeds the target track or not, the first comparator 15' compares the piece number and index data in the address of the present track read by the read circuit 13 and the piece number and index data in the address of the target track written in the write circuit 14. The same effect can also be obtained if comparison is made between the A time data in the respective addresses.

Furthermore, in the above described embodiment, the A time data in the respective addresses are stored in the first register 19 and the second register 20 and the searching speed is determined based on the difference between these A time data. However, the searching speed may be determined by detection of a difference in the frame numbers included in the respective addresses, which are counted from the first track of the program area and stored in the first register 19 and the second register 20. In addition, other information may also be used to determine the searching speed as far as it represents the distance between the track hit by the beam at present and the target track.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information selection device of a disc player which optically reads information of a plurality of pieces of music from a disc having a plurality of tracks where said information is optically recorded, the information of each of said plurality of pieces including piece number and index information consisting of information of the piece number of said each piece itself and information of a plurality of indexes existing within said each piece and each of said plurality of tracks having address information of said each track itself, said information selection device comprising:

pickup means for radiating a light beam on said tracks of said disc, the radiated light beam being modulated and reflected when said light beam hits said tracks, beam detecting means for detecting said address information of the track hit by the radiated beam at present, from said reflected beam, moving means for moving said radiated beam to make said radiated beam cross said tracks of said disc, and signal processing means including:

read means for reading said address information of the track hit by the radiated beam at present, detected by said beam detecting means, write means for writing the address information of a target track defined by a desired piece to be played and a desired index within said desired piece selected out of said plurality of pieces, first comparing means for comparing the address information of the track hit by the radiated beam at present, read by said read means, and the address information of said target track written in advance in said write means so that a control signal for reversing the moving direction of said radiated beam is generated and applied to said moving means each time it is determined that said radiated beam has passed said target track, a first register in which the address information of the track hit by the radiated beam is written when it is determined as a result of the comparison by said first comparing means that the address information of the track hit by the radiated beam is larger than the address information of the target track, a second register in which the address information of the track hit by the radiated beam is written when it is determined as a result of the comparison by said first comparing means that the address information of the track hit by the radiated beam is larger than the address information of the target track and second comparing means for comparing the address information written in said first register and the address information written in said second register; said second comparison means including means for generating a control sigtnal for decreasing the moving speed of the radiated beam from a first speed to a second speed when it is determined that the aboslute value of the difference between said address information written in said first register and said address informatiopn written in said second register is smaller than a first set value and that the radiated beam has passed the target track; said second comparison means including means for generating a control signal for decreasing the moving speed of the radiated beam from the second speed to a third speed when it is determined that the absolute value of the difference between said address information written in said first register and said address information written in said second register is smaller than a second set value and that the radiated beam has passed the target track; said second comparison means including means for generating a control signal for decreasing the moving speed of the radiated beam by steps until the absolute value of the difference between said address information written in said first register and said address information written in said second register becomes smaller than the n-th set value; and said second comparison means including means for thereafter generating a control signal for moving the radiated beam to the track corresponding to the address information written in said first register or said second register.

2. An information selection device in accordance with claim 1 wherein
said pickup means comprises:
a laser beam supplier for radiating said light beam, mirror means for guiding said light beam,
an objective lens (6) for converging said light beam on said disc,
tracking coils capable of moving horizontally said objective lens on said disc and
a beam splitter for separating said reflected beam from said light beam.

3. An information selection device in accordance with claim 2 wherein
said moving means further comprises:
tracking control means for controlling electric current flowing in said tracking coils so that said objective lens moves horizontally on said disc.

4. An information selection device in accordance with claim 1 wherein
said moving means comprises:
a motor for moving said pickup means radially on said disc and
motor control means for controlling the operation of said motor.

5. An information selection device in accordance with claim 1 wherein
said address information contains piece number and index information and
said first comparing means compares the piece number and indexes information in the address information of the track hit by the beam at present, read by said read means, and the piece number and index information in the address information of the target track written in said write means so as to determine whether the hitting point of the radiated beam exceeds the target track or not.

6. An information selection device in accordance with claim 1 wherein
said address information contains A time information and
said first comparing means compares the A time information in the address information of the track hit by the radiated beam at present, read by said read means and the A time information in the address information of the target track written in said right means so as to determine whether the hitting point of the radiated beam exceeds the target track or not.

7. An information selection device in accordance with claim 1 wherein
said address information contains A time information and
said first register and said second register each store the A time information in the address information so that the moving speed of said radiated beam is determined based on the difference between said A time information stored in said first register and said A time information stored in said second register.

8. An information selection device in accordance with claim 1 wherein
said address information contains information on the frame number from the first track of the program area of the disc and
said first register and said second register each store said frame number in the address information so that the moving speed of said radiated beam is determined based on the difference between said frame number stored in said first register and said frame number stored in said second register.

* * * * *